B. J. BIDDLE.
REMOVABLE BOTTOM FOR COOKING UTENSILS.
APPLICATION FILED JUNE 10, 1918.
1,345,119.
Patented June 29, 1920.
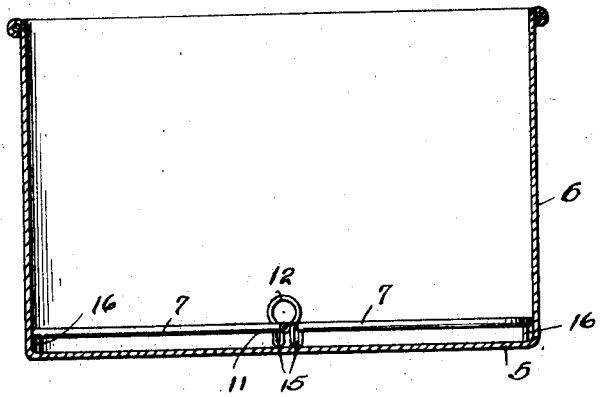
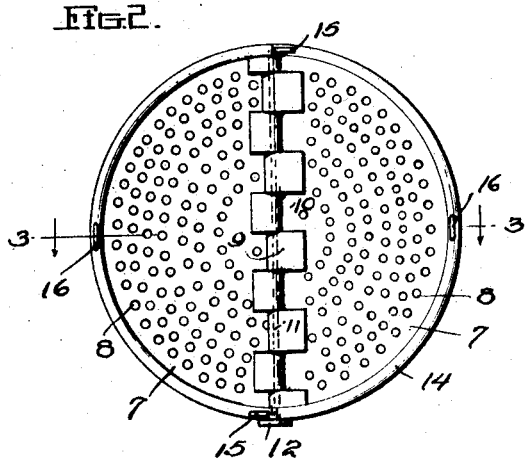
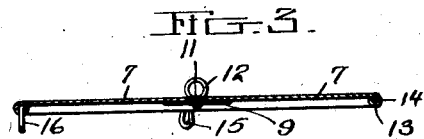
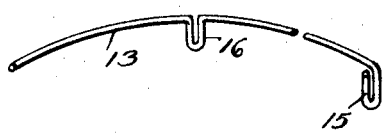
WITNESSES
Inventor
B. J. Biddle
By
Attorneys

UNITED STATES PATENT OFFICE.

BENJAMIN J. BIDDLE, OF MONTVILLE, NEW JERSEY.

REMOVABLE BOTTOM FOR COOKING UTENSILS.

1,345,119.      Specification of Letters Patent.      Patented June 29, 1920.

Application filed June 10, 1918. Serial No. 239,164.

*To all whom it may concern:*

Be it known that I, BENJAMIN J. BIDDLE, a citizen of the United States, residing at Montville, in the county of Morris and State of New Jersey, have invented certain new and useful Improvements in Removable Bottoms for Cooking Utensils; and I do hereby declare the following to be a full, clear, and exact description of the invention, such as will enable others skilled in the art to which it appertains to make and use the same.

This invention is an improvement in cooking utensils and has particular reference to a removable bottom therefor.

An object of the invention is to provide a removable bottom of improved construction which may be supported upon the bottom of a pot or other cooking utensil in spaced relation thereto and upon which the food to be cooked is placed so that it will not contact the bottom of the pot and become burnt in the event that the water in the pot should evaporate.

Another object is the provision of a device of this character which is simple in construction, easy to manufacture and effective in carrying out the purpose for which it is designed.

The inventive idea involved is capable of receiving a variety of mechanical expressions one of which, for the purpose of illustrating the invention, is shown in the accompanying drawing wherein:—

Figure 1 is a vertical sectional view through a pot or other cooking utensil showing a detachable or removable bottom in elevation.

Fig. 2 is a bottom plan view of the removable bottom.

Fig. 3 is a section on the line 3—3 of Fig. 2.

Fig. 4 is a perspective view of the rim of one of the sections of the removable bottom.

Fig. 5 is a perspective detail of the hinge rod.

The removable bottom is designed to be mounted upon the bottom 5 of the pot or other cooking utensil 6 which may be of any desired construction and said removable bottom preferably comprises a pair of complemental sections 7 which may be made of any suitable material and each of which is provided with a plurality of perforations 8 which will permit of the passage of water through the sections whereby the food resting thereon will be effectively cooked. Each section 7 is of semicircular formation but it is to be understood that the same may be made in any shape so as to fit within the pot 6 and prevent any of the food from falling upon the bottom 5 of the pot. The inner edge of each section is provided with a plurality of spaced knuckles 9 with recesses 10 therebetween for receiving the knuckles of the opposite section, and extending through all of said knuckles is a pivot rod 11 which coincides with the diameter of the bottom and which is provided upon one end thereof with a loop 12 adapted to extend above the bottom so as to be readily engaged by a suitable implement such as a fork in order that the bottom may be lifted and removed from the pot. By reason of the fact that the sections 7 are hinged together in the manner just described, it will be apparent that when the bottom is lifted from the pot said sections will swing about the rod 11 as a pivot and any food resting upon the sections will slide therefrom into the pot and any loss of the food as the detachable bottom is being removed will thereby be prevented.

To reinforce the outer edge of each of the sections 7 and support the same above the bottom 5 of the pot, there is preferably provided a semi-circular wire 13 around which the said outer edge of the section is bent in a bead as indicated at 14. One end of each wire 13 is bent downwardly and upon itself to form a supporting leg 15 which rests upon the bottom 5 of the pot, and said leg of one section is disposed adjacent to and on the opposite side of the pivot rod 11 from the supporting leg 15 of the other section 7. Each wire 13 is further bent upon itself at about its midlength to provide a depending supporting leg 16 arranged at a point substantially opposite the supporting leg 16 of the other section and from this construction it will be apparent that the removable or detachable bottom will be supported above the bottom 5 in spaced relation thereto.

What is claimed is:—

A removable bottom for cooking utensils comprising a pair of complemental foraminous sections, a rod hingedly connecting said sections and provided with an upstanding loop upon one end thereof adapted to be engaged by an implement to remove the sections from the utensil, said rod permitting of a pivotal movement of the sections when being removed, and a rim for each section having one end and an intermediate portion bent to provide depending supporting legs adapted to rest upon the bottom of the utensil to support the sections in spaced relation thereto.

In testimony whereof, I affix my signature, in the presence of two witnesses.

BENJAMIN J. BIDDLE.

Witnesses:
AMUND N. AMUNDSEN,
A. E. STONE.